(12) United States Patent
Horn et al.

(10) Patent No.: US 7,031,779 B2
(45) Date of Patent: Apr. 18, 2006

(54) METHOD AND APPARATUS FOR AUTOMATED CRACK BEHAVIOR PREDICTION DETERMINATION

(75) Inventors: Ronald Martin Horn, Palo Alto, CA (US); F. Peter Ford, Rexford, NY (US); Peter L. Andersen, Schenectady, NY (US); Jenny Y. Mui, San Jose, CA (US)

(73) Assignee: General Electric Company, Schenectady, NY (US)

( * ) Notice: Subject to any disclaimer, the term of this patent is extended or adjusted under 35 U.S.C. 154(b) by 732 days.

(21) Appl. No.: 09/748,144

(22) Filed: Dec. 27, 2000

(65) Prior Publication Data

US 2001/0053965 A1 Dec. 20, 2001

Related U.S. Application Data

(60) Provisional application No. 60/211,490, filed on Jun. 14, 2000.

(51) Int. Cl.
*G05B 13/02* (2006.01)

(52) U.S. Cl. .................... 700/32; 700/29; 700/108; 376/277; 376/305

(58) Field of Classification Search .............. 376/245, 376/249, 277, 305; 703/7, 9, 10; 700/29, 700/32, 108
See application file for complete search history.

(56) References Cited

U.S. PATENT DOCUMENTS

| | | | | |
|---|---|---|---|---|
| 5,307,385 | A | * 4/1994 | Shimanuki et al. | 376/249 |
| 5,398,268 | A | * 3/1995 | Ibe et al. | 376/305 |
| 5,579,354 | A | 11/1996 | Sakai et al. | 376/245 |
| 5,623,109 | A | * 4/1997 | Uchida et al. | 73/865.9 |
| 5,673,297 | A | * 9/1997 | Andresen | 376/306 |
| 5,724,254 | A | 3/1998 | Millett et al. | 702/179 |
| 5,768,330 | A | * 6/1998 | Andresen et al. | 376/305 |
| 5,817,958 | A | * 10/1998 | Uchida et al. | 73/865.9 |
| 6,259,758 | B1 | * 7/2001 | Kim et al. | 376/305 |
| 6,298,308 | B1 | * 10/2001 | Reid et al. | 702/56 |
| 6,327,510 | B1 | * 12/2001 | Yoshida et al. | 700/9 |
| 6,754,673 | B1 | * 6/2004 | Horn et al. | 707/104.1 |
| 2001/0053940 | A1 | * 12/2001 | Horn et al. | 700/32 |

* cited by examiner

*Primary Examiner*—Anthony Knight
*Assistant Examiner*—Ronald D Hartman, Jr.
(74) *Attorney, Agent, or Firm*—Nixon & Vanderhye P.C.

(57) ABSTRACT

A method of predicting component crack behavior in a nuclear reactor provides access to a crack growth behavior model over a global network. A user inputs water chemistry and material characteristics of a particular nuclear reactor and can perform crack growth rate predictions by accessing the behavior model over the computer network. A crack growth prediction profile or crack growth based result is output over the network according to an analysis by the behavior model.

5 Claims, 5 Drawing Sheets

Fig. 3

File  Edit  View  Go  Window  Help

LOGO

| GE Home | GE Power | GE PLEDGE-Chem | Our Mission | News & Info | Our Experts | Contact Us | Help |

Resources
Chem Database (fleet)
Plant Rankings
GENE Issued Papers
Noble Chem Update

PLEDGE Tools
Guidelines Calcs
Samples & Demos
Interactive Running
Scenario Plots

Chem Database
Yearly Averages
Cycle Averages
Daily Averages

Upcoming Functions
Download PLEDGE Runs
Future PLEDGE Improvements
Added Chem Database Features

GE PLEDGE-Chem Database

GE PLEDGE-Chem Database | Daily Averages

Complete the form as requested below and submit to obtain historical data online.

Select One Plant ID: [TS07 ▽]

Input Time Period (mm/dd/yyyy): [01] / [01] / [1995] - [05] / [03] / [1995]

Select Sample Location: [Reactor Water ▽]

Select Species: [Conductivity ▽]

[Submit]

Privacy Policy | Terms of Use

[ Atlanta  Baltimore  Chicago  Cleveland  Dallas  Los Angeles  Madrid  Milwaukee ]

METHOD AND APPARATUS FOR AUTOMATED CRACK BEHAVIOR PREDICTION DETERMINATION

This application claims the benefit of U.S. Provisional Patent Application Ser. No. 60/211,490, filed Jun. 14, 2000, the entire content of which is herein incorporated by reference.

BACKGROUND OF THE INVENTION

This invention relates to predicting crack behavior in boiling water nuclear reactors and, more particularly, to a method and system for evaluating the past and future behavior of cracks or postulated crack indications in specific or postulated nuclear reactor components interactively without human intervention.

Water chemistry characteristics in a boiling water nuclear reactor can be used to predict crack growth behavior using an existing fundamental crack growth behavior model. The model was derived from detailed engineering analyses of historical data and historical behavior so that crack growth behavior prediction can be performed accurately using water chemistry characteristics and materials characteristics.

Current evaluations, however, require separate assessments that are performed by individuals to characterize several key input parameters. These data are then used as specific inputs to the fundamental crack growth behavior model to perform the crack behavior assessment. Generation of some of the inputs may require running other models or running evaluations from existing databases. Consequently, interactive assessments are time-consuming and inefficient. The conventional analysis also restricts the ability to perform past and future assessments in a single time span. Still further, access and use of the fundamental model is limited to only a number of specialists. Because the inputs make use of different inputs requiring outputs from special sources or requiring work by specialists of another discipline, current users may not use the best input information.

BRIEF SUMMARY OF THE INVENTION

In an exemplary embodiment of the invention, a method of predicting component crack behavior in a nuclear reactor includes (a) receiving input water chemistry characteristics over a global computer network, (b) accessing a crack growth behavior model that predicts component crack behavior according to the input water chemistry characteristics, and (c) outputting over the global computer network a crack growth prediction profile or a crack growth derived result according to an analysis of the crack growth behavior model. Step (c) may be practiced by generating a graphical representation of a crack growth rate according to the input water chemistry characteristics. Step (c) may also be practiced by outputting a real time crack growth prediction according to the input water chemistry characteristics. Step (c) may also be used as the basis of another analysis effort.

In another exemplary embodiment of the invention, a computer system for predicting component crack behavior in a boiling water nuclear reactor includes at least one user computer running a computer program that receives input water chemistry characteristics. A system server running a server program is interconnected with the at least one user computer by a computer network. The system server stores a crack growth behavior model that predicts component crack behavior according to the input water chemistry characteristics. The system server outputs over the computer network a crack growth prediction profile or crack growth based result according to an analysis of the crack growth behavior model.

In still another exemplary embodiment of the invention, a computer program embodied on a computer readable medium for predicting component crack behavior in a nuclear reactor is configured to effect the method of the invention.

BRIEF DESCRIPTION OF THE DRAWINGS

FIG. 3 is a sample input screen;

DETAILED DESCRIPTION OF THE INVENTION

Figure 1:
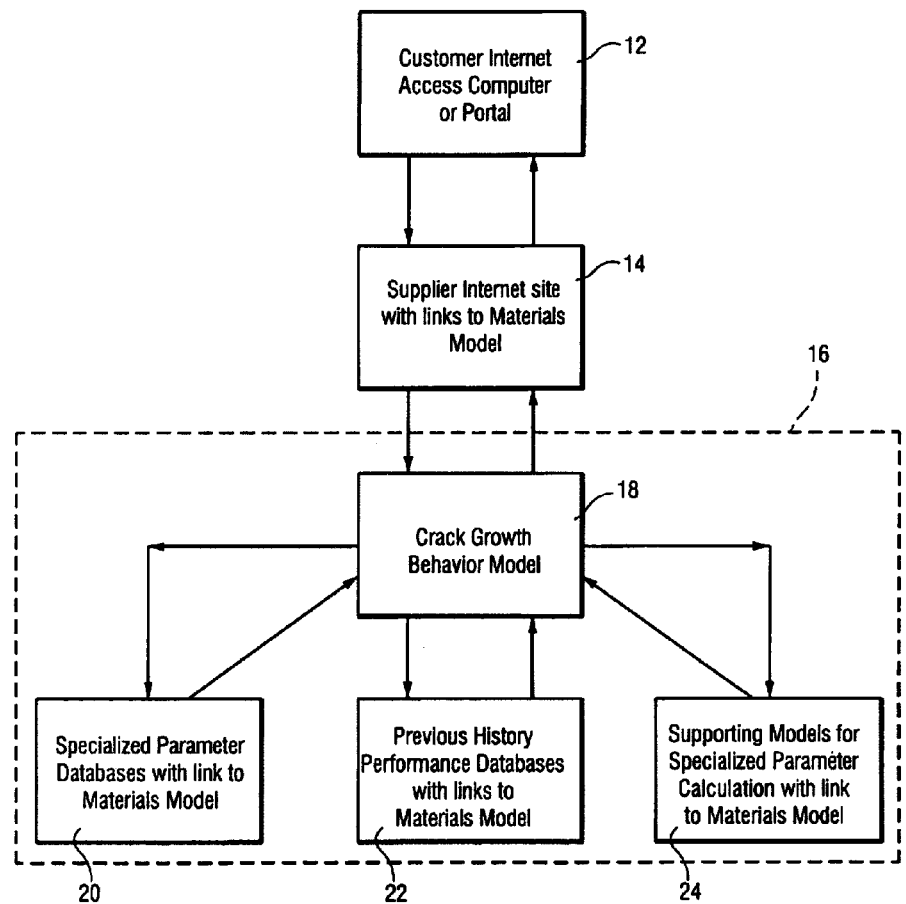
FIG. 1 is a schematic illustration of the web site architecture.
Figure 2:
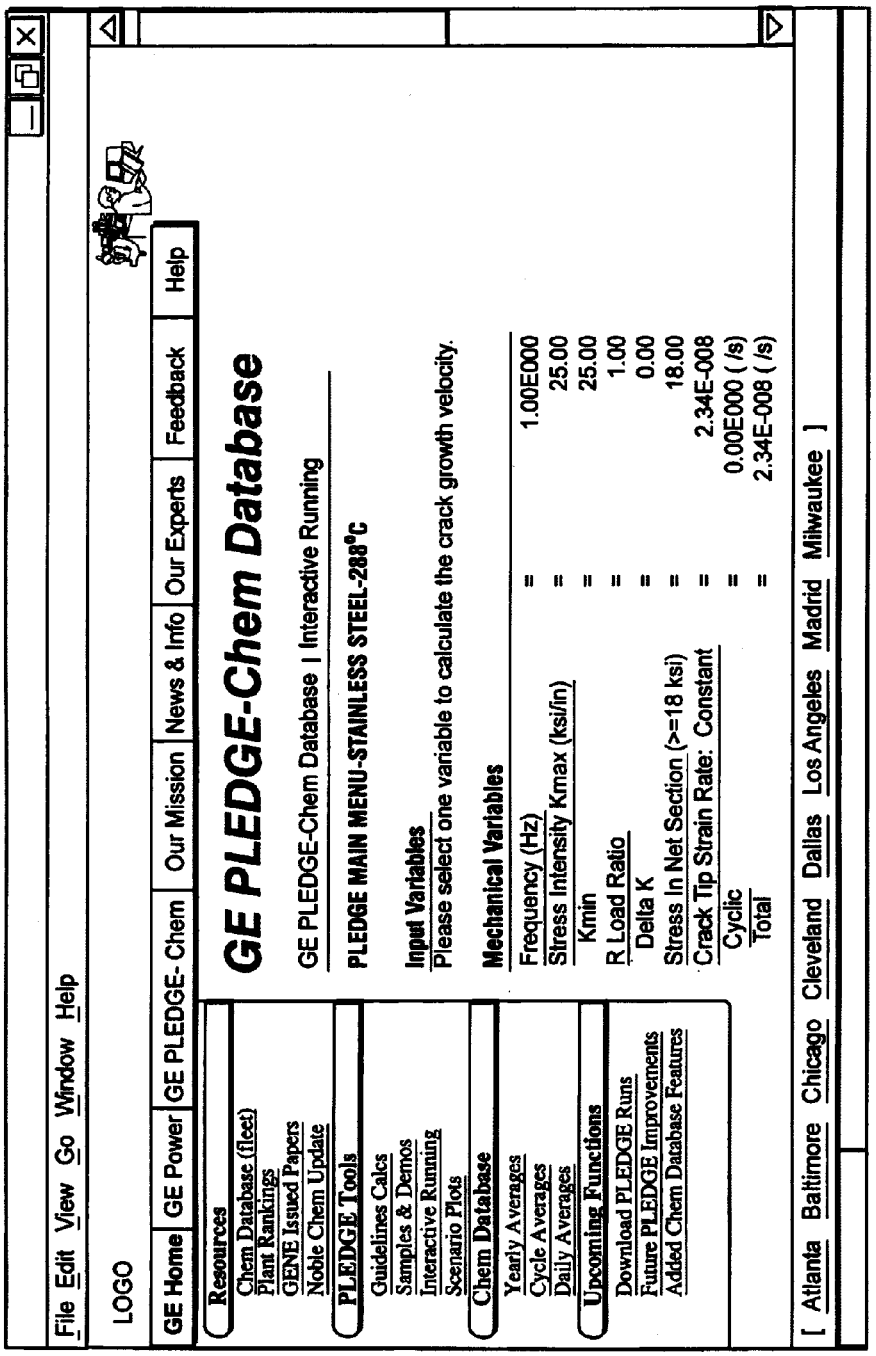
FIG. 2 is an exemplary screen shot showing exemplary input water chemistry characteristics.

The crack behavior predicting system implemented in the diagrams of FIGS. 1–4 is preferably a browser-based system in which a program running on a user's computer (the user's web browser) requests information from a server program running on a system server. The system server sends the requested data back to the browser program and the browser program then interprets and displays the data on the user's computer screen. The process is as follows:

1. The user runs a web browser program on his/her computer.
2. The user connects to the server computer (e.g., via the Internet). Connection to the server computer may be conditioned upon the correct entry of a password as is well known.
3. The user requests a page from the server computer. The user's browser sends a message to the server computer that includes the following:
   the transfer protocol (e.g., http://); and
   the address, or Uniform Resource Locator (URL).
4. The server computer receives the user's request and retrieves the requested page, which is composed, for example, in HTML (Hypertext Markup Language).
5. The server then transmits the requested page to the user's computer.
6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the crack behavior predicting system of the present invention include Netscape® Navigator available from Netscape® Communications Corporation and Internet Explorer available from Microsoft® Corp.

While the above description contemplates that each user has a computer running a web browser, it will be appreciated that more than one user could use a particular computer terminal or that a "kiosk" at a central location (e.g., a cafeteria, a break area, etc.) with access to the system server could be provided.

It will be recognized by those in the art that various tools are readily available to create web pages for accessing data stored on a server and that such tools may be used to develop and implement the crack behavior predicting system described below and illustrated in the accompanying drawings.

Figure 5:
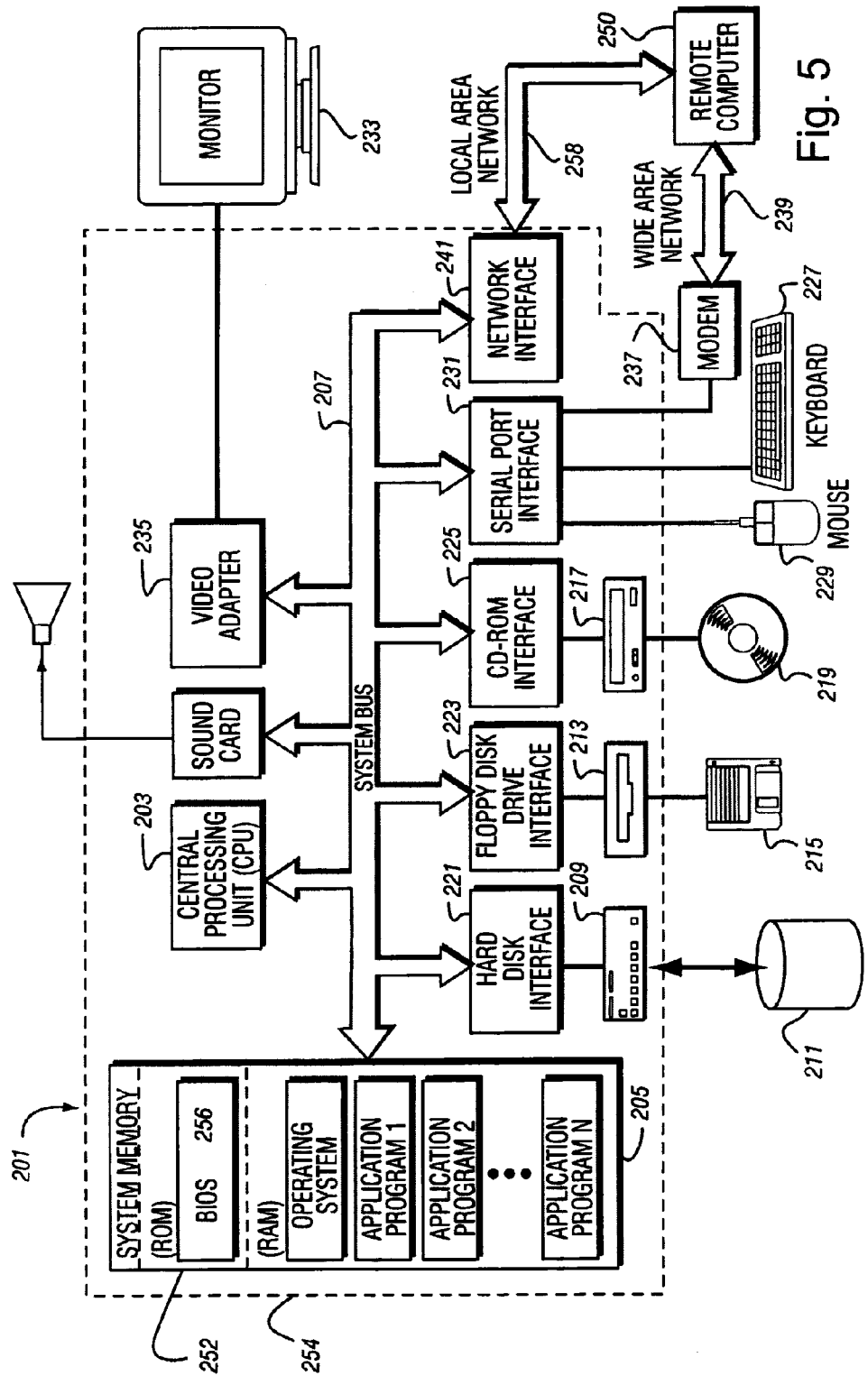
FIG. 5 is a schematic block diagram showing the general components and operation of a computer.

FIG. 5 generally illustrates a computer system 201 suitable for use as the client and server components of the crack behavior predicting system of the invention. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 205 includes read only memory (ROM) 252 and random access memory (RAM) 254. A basic input/output system (BIOS) 256, containing the basic routines that help to transfer information between elements within computer system 201, such as during start-up, is stored in ROM 252. Computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or ROM 252 and/or RAM 254 of the system memory 205. Such program modules may include an operating system providing graphics and sound APIs, one or more application programs, other program modules, and program data. A user may enter commands and information into computer system 201 through input devices such as a keyboard 227 and a pointing device 229. Other input devices may include a microphone, joystick, game controller, satellite dish, scanner, or the like. These and other input devices are often connected to the processing unit 203 through a serial port interface 231 that is coupled to the system bus 207, but may be connected by other interfaces, such as a parallel port interface or a universal serial bus (USB). A monitor 233 or other type of display device is also connected to system bus 207 via an interface, such as a video adapter 235.

The computer system 201 may also include a modem 237 or other means for establishing communications over the wide area network 239, such as the Internet. The modem 237, which may be internal or external, is connected to the system bus 207 via the serial port interface 231. A network interface 241 may also be provided for allowing the computer system 201 to communicate with a remote computing device 250 via a local area network 258 (or such communication may be via the wide area network 239 or other communications path such as dial-up or other communications means). The computer system 201 will typically include other peripheral output devices, such as printers and other standard peripheral devices.

As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used and the invention is not limited in this respect.

FIG. 1 is a schematic illustration of the system architecture. The user employs a suitable Internet access computer or like access portal 12 to connect with a system server 14 running a server program Internet site. The Internet site 14 includes links to pages enabling input of water chemistry characteristics such as the example page shown in FIG. 2. For the crack behavior analysis, examples of suitable input characteristics include loading parameters such as frequency, stress intensity (as a "Kmax"), R load ratio, Delta K, Crack Tip Strain Rate, water chemistry and environmental parameters such as conductivity, corrosion potential, oxygen level, anionic species concentrations, flux and cumulative fluence and material parameters such as sensitization level and strength level.

Figure 4:
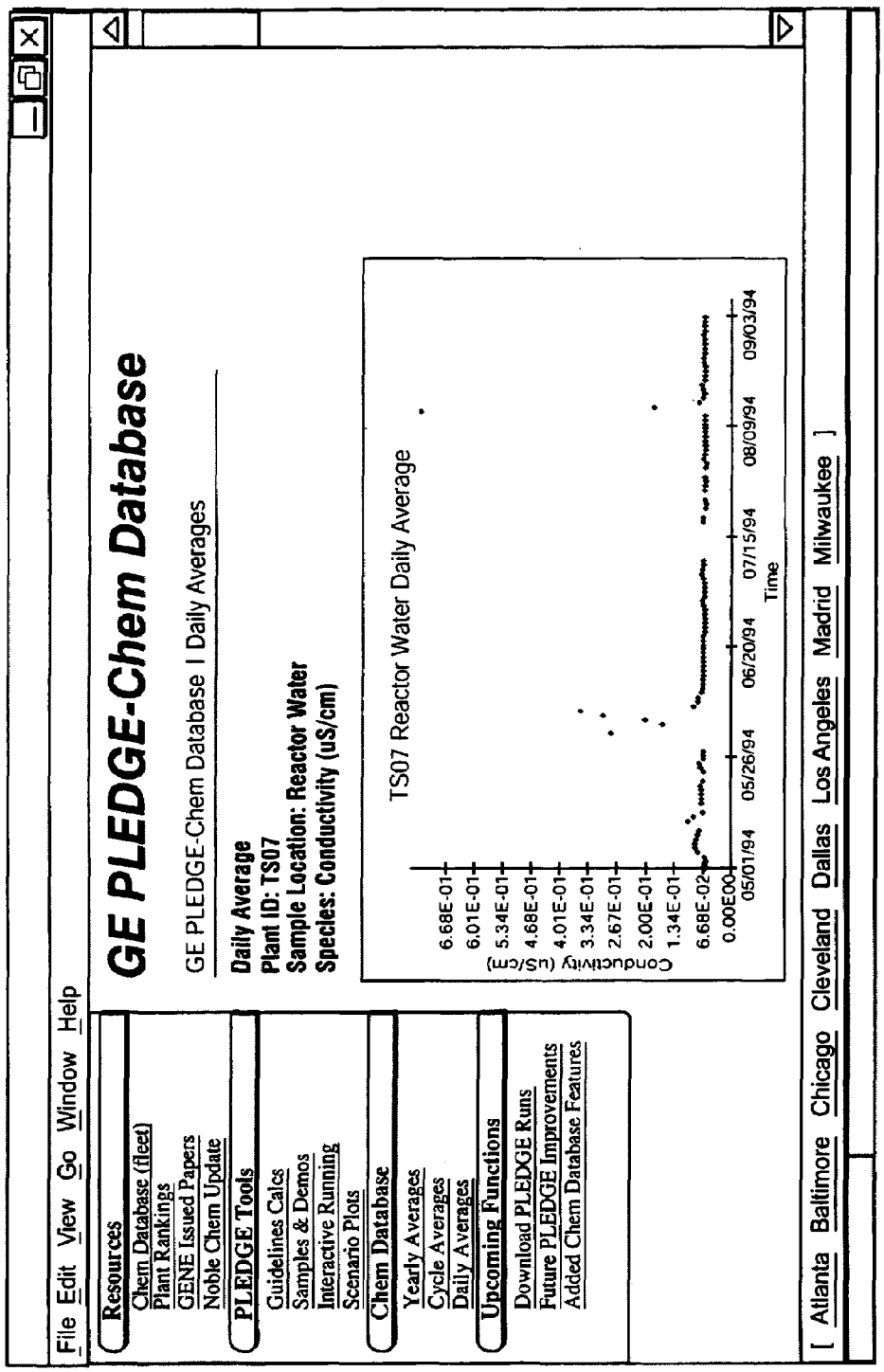
FIG. 4 is a sample screen illustrating a graphical representation used for input to the crack behavior model.

When all inputs are complete, the server system accesses a crack growth behavior model 16 that predicts component crack behavior according to the water chemistry characteristics input via the page 14. The crack growth behavior model 16 encompasses the model 18 itself, which accesses specialized parameter databases 20 with links to a materials model, previous history performance databases 22 with links to the materials model, and supporting models for specialized parameter calculations 24 with links to the materials model. FIGS. 3 and 4 illustrate example screen shots of history performance databases accessed by the crack growth behavior model 18 for determining the crack growth prediction profile. In FIGS. 3 and 4, a historical plot of conductivity readings in the water chemistry over time is shown. As shown, using historical and current data, the crack growth prediction profile can represent a real time crack growth prediction according to the input water chemistry characteristics. This is a "real time" evaluation in the sense that it uses the current plant data in the context of historical data to project future behavior, a process that can be updated at any time to include new plant data. The output is preferably in the form of a graphical representation of a crack growth rate such as a chart or graph, although any suitable output of the crack growth prediction profile or a derived result could be used.

With the system of the present invention, a user can calculate the predicted behavior of a component or component location over any relevant time frame by simply specifying key input parameters without human intervention. Using known drop-down menus and the like for inputting water chemistry characteristics and materials parameters, the selection of parameter values is made easy. As such, the crack growth behavior model is accessible to a much larger set of potential users. Still further, users can make multiple evaluations and real time evaluations that are helpful in decision-making and planning. The system provides users the ability to maintain records of previous evaluations for future reference to determine reactor trends and the like. The system also allows the user to improve the quality of the analysis since the system uses input from databases or applicable complementary models for inputs without human intervention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of predicting component crack behavior in a nuclear reactor, the method comprising:
   (a) receiving input water chemistry characteristics over a global computer network;
   (b) accessing a crack growth behavior model that predicts component crack behavior according to the input water chemistry characteristics; and
   (c) outputting over the global computer network a crack growth prediction profile according to an analysis of the crack growth behavior model by outputting a real time crack growth prediction according to the input water chemistry characteristics.

2. A method according to claim 1, wherein step (c) is practiced by generating a graphical representation of a crack growth rate according to the input water chemistry characteristics.

3. A computer system for predicting component crack behavior in a nuclear reactor, the computer system comprising:
   at least one user computer running a computer program that receives input water chemistry characteristics; and
   a system server running a server program, the at least one user computer and the system server being interconnected by a computer network, the system server storing a crack growth behavior model that predicts component crack behavior according to the input water chemistry characteristics, and the system server outputting over the computer network a crack growth prediction profile according to an analysis of the crack growth behavior model by outputting a real time crack growth prediction according to the input water chemistry characteristics.

4. A computer program embodied on a computer readable medium for predicting component crack behavior in a boiling water nuclear reactor, the computer program comprising:
   means for receiving input water chemistry characteristics over a global computer network;
   means for accessing a crack growth behavior model that predicts component crack behavior according to the input water chemistry characteristics; and
   means for outputting over the global computer network a crack growth prediction profile or crack growth based result according to an analysis of the crack growth behavior model by outputting a real time crack growth prediction according to the input water chemistry characteristics.

5. A method of predicting component crack behavior in a nuclear reactor, the method comprising:
   (a) receiving input water chemistry characteristics over a global computer network;
   (b) accessing a crack growth behavior model that predicts component crack behavior according to the input water chemistry characteristics, wherein the input water chemistry characteristics are the only data input via the global computer network for predicting component crack behavior; and
   (c) outputting over the global computer network a crack growth prediction profile according to an analysis of the crack growth behavior model by outputting a real time crack growth prediction according to the input water chemistry characteristics.

* * * * *

UNITED STATES PATENT AND TRADEMARK OFFICE
CERTIFICATE OF CORRECTION

| | |
|---|---|
| PATENT NO. | : 7,031,779 B2 |
| APPLICATION NO. | : 09/748144 |
| DATED | : April 18, 2006 |
| INVENTOR(S) | : Horn et al. |

It is certified that error appears in the above-identified patent and that said Letters Patent is hereby corrected as shown below:

On the title page:

Delete "(75) Inventor: Peter L. Andersen" and insert

--(75) Inventor: Peter L. Andresen--

Signed and Sealed this

Eighteenth Day of July, 2006

JON W. DUDAS
*Director of the United States Patent and Trademark Office*